US012423869B2

(12) United States Patent
Boes et al.

(10) Patent No.: US 12,423,869 B2
(45) Date of Patent: *Sep. 23, 2025

(54) HYPERSPECTRAL IMAGING SPECTROPHOTOMETER AND SYSTEM

(71) Applicant: X-RITE, INCORPORATED, Grand Rapids, MI (US)

(72) Inventors: Christian Boes, Grandville, MI (US); Thomas Richardson, Ada, MI (US); Richard John Van Andel, Grand Rapids, MI (US); David Bosscher, Alto, MI (US); David Salyer, Ada, MI (US)

(73) Assignee: X-RITE INCORPORATED, Grand Rapids, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/357,684

(22) Filed: Jul. 24, 2023

(65) Prior Publication Data

US 2023/0368426 A1 Nov. 16, 2023

Related U.S. Application Data

(63) Continuation of application No. 17/141,662, filed on Jan. 5, 2021, now Pat. No. 11,748,912, which is a (Continued)

(51) Int. Cl.
| | |
|---|---|
| *G06T 7/90* | (2017.01) |
| *G01J 3/02* | (2006.01) |
| *G01J 3/10* | (2006.01) |
| *G01J 3/46* | (2006.01) |
| *G01J 3/51* | (2006.01) |

(Continued)

(52) U.S. Cl.
CPC ............. *G06T 7/90* (2017.01); *G01J 3/0291* (2013.01); *G01J 3/10* (2013.01); *G01J 3/462* (2013.01); *G01J 3/463* (2013.01); *G01J 3/465* (2013.01); *G01J 3/51* (2013.01); *G01J 3/524* (2013.01); *G01N 21/57* (2013.01); *G06T 7/11* (2017.01); *G06T 2207/10024* (2013.01); *G06T 2207/10152* (2013.01); *G06T 2207/20012* (2013.01); *G06T 2207/20216* (2013.01)

(58) Field of Classification Search
CPC ... G06T 7/90; G06T 7/11; G06T 2207/10024; G06T 2207/10152; G06T 2207/20012; G06T 2207/20216; G01J 3/0291; G01J 3/10; G01J 3/462; G01J 3/463; G01J 3/465; G01J 3/51; G01J 3/524; G01N 21/57
USPC ...... 382/164; 348/218.1, 342, 278; 356/302, 356/402
See application file for complete search history.

(56) References Cited

U.S. PATENT DOCUMENTS

2017/0122807 A1* 5/2017 Kasahara ................ G01J 3/524

OTHER PUBLICATIONS

Summary of Decision of Rejection regarding related Chinese Application 201880052608.5 (redacted), dated Jan. 4, 2024 (3 pages).
(Continued)

*Primary Examiner* — Kathleen Y Dulaney
(74) *Attorney, Agent, or Firm* — Hahn Loeser & Parks, LLP

(57) ABSTRACT

A hyperspectral imaging spectrophotometer and system, with calibration, data collection, and image processing methods designed to match human visual perception and color matching of complex colored objects.

19 Claims, 10 Drawing Sheets

Related U.S. Application Data continuation of application No. 16/007,570, filed on Jun. 13, 2018, now Pat. No. 10,909,723.

(60) Provisional application No. 62/518,985, filed on Jun. 13, 2017.

(51) Int. Cl.
*G01J 3/52* (2006.01)
*G01N 21/57* (2006.01)
*G06T 7/11* (2017.01)

(56) References Cited

OTHER PUBLICATIONS

Decision of Rejection regarding related Chinese Application 201880052608.5, dated Dec. 14, 2023 (3pgs.).

* cited by examiner

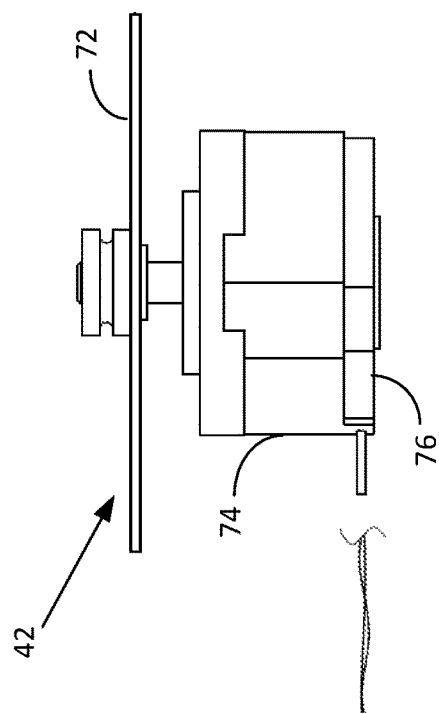
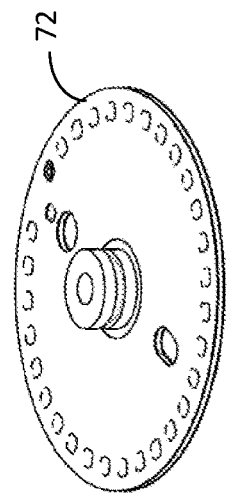
Fig. 4a
Fig. 4b

HYPERSPECTRAL IMAGING SPECTROPHOTOMETER AND SYSTEM

CROSS-REFERENCE TO RELATED APPLICATIONS

The present application is a continuation of U.S. patent application Ser. No. 17/141,662, filed Jan. 5, 2021, which is a continuation of U.S. Pat. No. 10,909,723, issued Feb. 2, 2021, which claims the benefit of U.S. Provisional Application No. 62/518,985, filed Jun. 13, 2017.

The present application relates to a hyperspectral imaging spectrophotometer and system, with calibration, data collection, and image processing methods designed to match human visual perception and color matching of complex colored objects.

BACKGROUND

Retail paint stores typically offer paint matching services, wherein paints are custom formulated to match a color of a sample inspiration item. The inspiration item may be a paint chip, a fabric, or an object.

In one example, a customer goes to a hardware store and would like to have a custom can of paint mixed that matches a physical color patch from a fan deck or other physical sample. In the workflow, the customer's color patch is first measured by an instrument such as a spectrophotometer or colorimeter, that is capable of outputting calibrated colorimetric data such as a spectral reflectance curve, or tristimulus values in a color space such as CIE L*a*b*. Once colorimetric data is obtained for the color patch, the values can be used as inputs to algorithms that use paint databases and compute either, a) the database paint color that most closely matches that of the patch, or b) a recipe of colorants and quantities from an algorithmic formulation in which to blend with a quantity of paint base material in order to make a can of paint that matches the customer's sample.

However, retail paint stores have difficulty matching 10-25% of inspiration samples. The mismatches result in increased labor, delay in delivery time, inaccurate paint matching, wastage of paint and reduced customer satisfaction. Existing spectrophotometers, though fairly accurate on planar uniform-color paint-like samples, are unable to satisfactorily measure many textured samples, samples with defects, samples with multiple colored regions that need to be discriminated and evaluated separately, and samples with other colorimetric spatial complexity. They also are difficult or impossible to use on multi-color samples, such as patterned fabric or wall paper. This is because existing spectrophotometers are spot measurement devices that compute the average color over a contiguous region of a sample. All of the spatial color information is lost because the average reduces the measurement to a single number. Further, since spatial information is averaged into a single measurement, prior art instrumentation cannot remove defects, make statistical analysis of sub-regions, separate a measurement into dominant colors, remove gloss or shadows that are not part of the sample's core color, or apply spatial transforms relevant to modelling human visual perception.

SUMMARY

A hyperspectral imaging system for measuring one or more colors of a sample surface, may have a sample measurement area, an illumination assembly, a pick-up optics assembly, a main processor, and an image data processor. The illumination assembly includes at least one illuminator directed toward the sample measurement area. The pick-up optics assembly includes a plurality of selectable spectral filters having different nominal peak wavelengths and an imaging camera, where a field of view of the imaging camera includes the sample measurement area. The main processor is coupled to the illumination assembly and to the pick-up optics assembly, the main processor being configured with instructions stored in non-volatile memory to: operate the pick-up optics assembly to successively step through the plurality of spectral filters and obtain at least one two-dimensional image at each spectral filter step, and to activate and deactivate the illuminators. The image data processor is configured with instructions stored in non-volatile memory to: receive images corresponding to each spectral filter step, assemble the received images into a hyperspectral image cube, and to process the image cube to determine at least one color of the sample surface. The hyperspectral image cube may comprise three dimensions; two dimensions corresponding to the two dimensions of the acquired images and a third dimension corresponding to the nominal peak wavelengths of the plurality of selectable filters. The main processor and the image data processor may be combined or separate.

The image data processor may be further configured to process the image cube to determine at least one color of the sample surface by: identify a region of interest; analyze the region of interest to determine whether a sufficient area of uniform color exists to permit a simple color averaging function; if a sufficient area of uniform color exists, perform a simple color averaging process to determine a color of the region of interest; and if a sufficient area of uniform color does not exist, segment pixels of an image to exclude pixels including shadowed surfaces and to exclude pixels including specular reflections and determine a color of the remaining pixels. The image data processor is further configured to process the image cube to determine at least one color of the sample surface by segmenting pixels of an image to exclude pixels including shadowed surfaces and to exclude pixels including specular reflections and determine a color of the remaining pixels for a plurality of hues. A plurality of dominant hues may be identified and presented to a user. The segmenting may comprise segmenting pixels having a lightness lower than the $50^{th}$ percentile into a first bin, segmenting pixels having a lightness at or above the $95^{th}$ percentile into a second bin, and the remaining pixels into a third bin, wherein a color of the third bin is determined. A plurality of colors may be determined for a sample surface by constructing a reflectance curve for a plurality of pixel locations in an acquired image with respect to the nominal peak wavelengths of the plurality of spectral filters, and transforming each of the reflectance curves into coordinates in a three-dimensional color space.

The illumination assembly may include a plurality of illuminators directed toward the sample measurement area. The plurality of spectral filters may comprise narrow bandpass filters.

The hyperspectral imaging system may further comprise a gloss measurement assembly with pick-up optics being directed toward the sample stage and in the same plane as the at least one illuminator.

The image cube may comprise a plurality of two dimensional images, with one axis of the cube corresponding to the wavelengths of the plurality of spectral filters.

The main processor may be further configured with instructions stored in non-volatile memory to obtain an image under ambient lighting illumination and active illumination at each spectral filter step.

A method for measuring one or more colors of a sample surface, may comprise: placing a sample to be measured within a measurement area of an imaging spectrophotometer including a plurality of selectable spectral filters having different nominal peak wavelengths and an imaging camera; successively stepping through the plurality of spectral filters of the pick-up optics assembly and obtaining at least one two-dimensional image at each spectral filter step; assembling the images into a hyperspectral image cube; and processing the image cube to determine at least one color of the sample surface. The step of processing the image cube to determine at least one color of the sample surface may further comprise: identifying a region of interest; analyzing the region of interest to determine whether a sufficient area of uniform color exists to permit a simple color averaging function; if a sufficient area of uniform color exists, performing a simple color averaging process to determine a color of the region of interest; if a sufficient area of uniform color does not exist, segmenting pixels of an image to exclude pixels including shadowed surfaces and to exclude pixels including specular reflections; and determining a color of the remaining pixels.

The step of processing the image cube to determine at least one color of the sample surface further may further comprise segmenting pixels of an image to exclude pixels including shadowed surfaces and to exclude pixels including specular reflections and determining a color of the remaining pixels for a plurality of hues. For example, the segmenting may comprise segmenting pixels having a lightness lower than the $50^{th}$ percentile into a first bin, segmenting pixels having a lightness at or above the $95^{th}$ percentile into a second bin, and the remaining pixels into a third bin, wherein a color of the third bin is determined.

BRIEF DESCRIPTION OF THE DRAWINGS

The following drawings illustrate the concepts of the present invention. Illustrations of an exemplary device are not necessarily drawn to scale.

FIG. 4a is an exploded view of the filter wheel assembly of the example of FIG. 3.

FIG. 4b is a side view of the filter wheel assembly of the example of FIG. 3.

DETAILED DESCRIPTION

Figure 1:
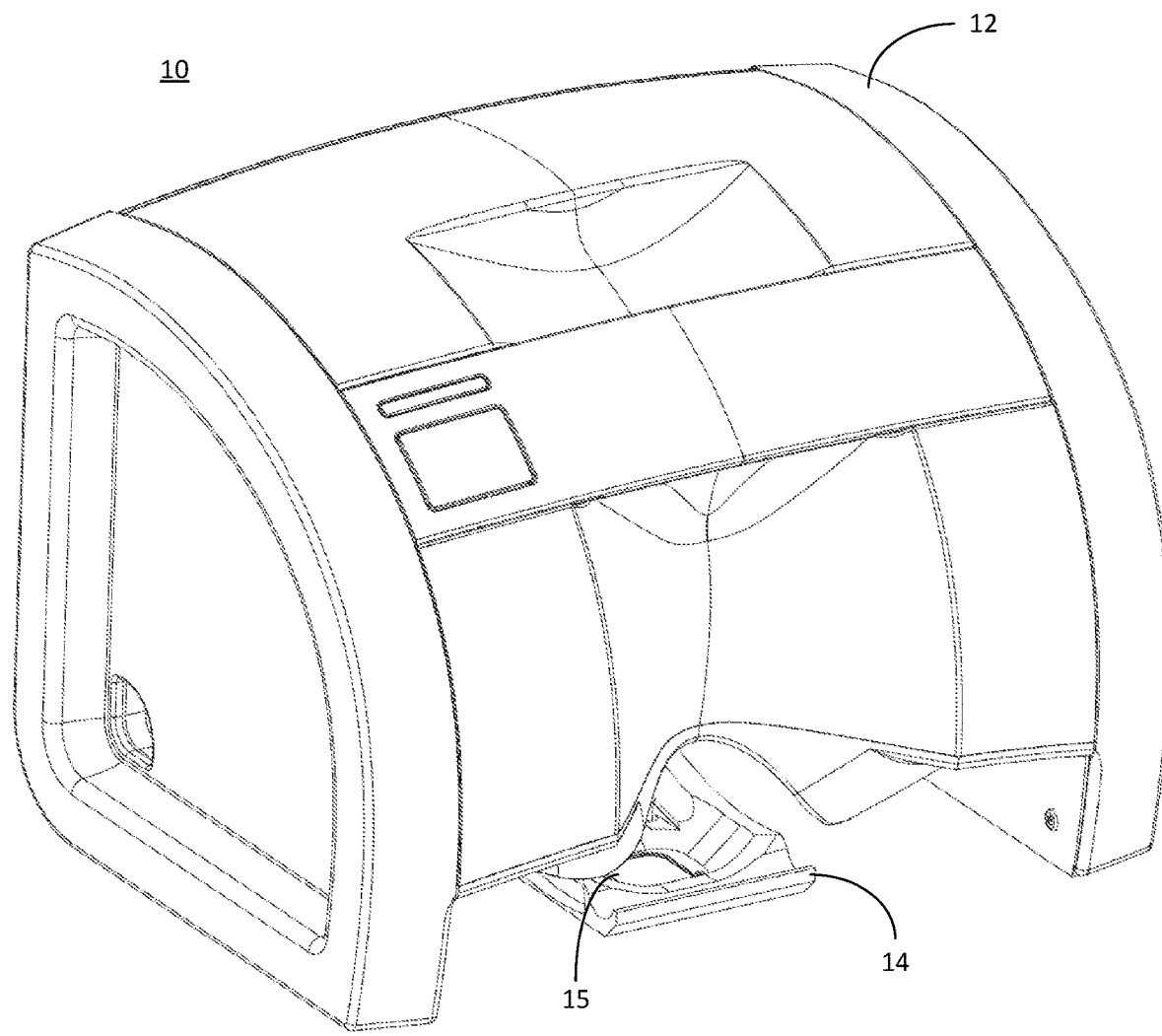
FIG. 1 is a perspective view of an embodiment of a hyperspectral imaging spectrophotometer and system according to one aspect of the present invention.

While the embodiments described can take many different forms, specific embodiments illustrated in the drawings will be described with the understanding that the present disclosure is to be considered an exemplification of the principles of the invention, and is not intended to limit the invention to a specific embodiment illustrated.

A hyperspectral imaging spectrophotometer system is described. Rather than reduce a given sample to a single color measurement, the hyperspectral imaging spectrophotometer system acquires successive two dimensional images of a sample through a series of narrow band spectral filters, and then processes the images to provide a three-dimensional hyperspectral reflectance data cube (two spatial dimensions plus a spectral reflectance data dimension).

The hyperspectral imaging spectrophotometer system comprises an imaging spectrophotometer and a computer for image processing. In a preferred embodiment, the imaging spectrophotometer and the computer are embodied in the same instrument. The computer for image processing may comprise a non-volatile memory device comprising computer-readable instructions for image processing, for example as an image processing module. The non-volatile memory device may comprise an operating system, for example a Linux operating system, for example a real-time operating system.

The imaging spectrophotometer acquires two-dimensional colorimetric measurements to form image data of a sample, for example using an imaging sensor, and the computer uses transforms to convert the image data into a colorimetric representation that closely matches the human visual perception of physical samples, for example physical samples that may comprise visual textures or patterns. The imaging spectrophotometer is calibrated for color measurements and collects a plurality of two-dimensional (spatial dimensions) measurement frames of the sample at a plurality of wavelengths of light, respectively, to create a three-dimensional true spectral color image that captures spatial colorimetric features. The third-dimension is color data (wavelength) associated with each spatial location. The three-dimensional measurements, or image cube, is then analyzed for sample uniformity, texture, statistical artifacts, color groupings, and spatial complexity in order to produce transformed color information that more closely matches human visual perception.

With the described system, there is no need for any part of the hyperspectral imaging spectrophotometer system to contact a sample while making measurements, and the non-contact ability helps match paint samples that are not completely dry. In some embodiments, the system is designed to reject the contribution of ambient light illumination to the measurements. In some embodiments, the system is designed to exchange data with a tethered host computer running an application, for example an application that allows the user to preview and select the sample region being measured.

Figure 2:
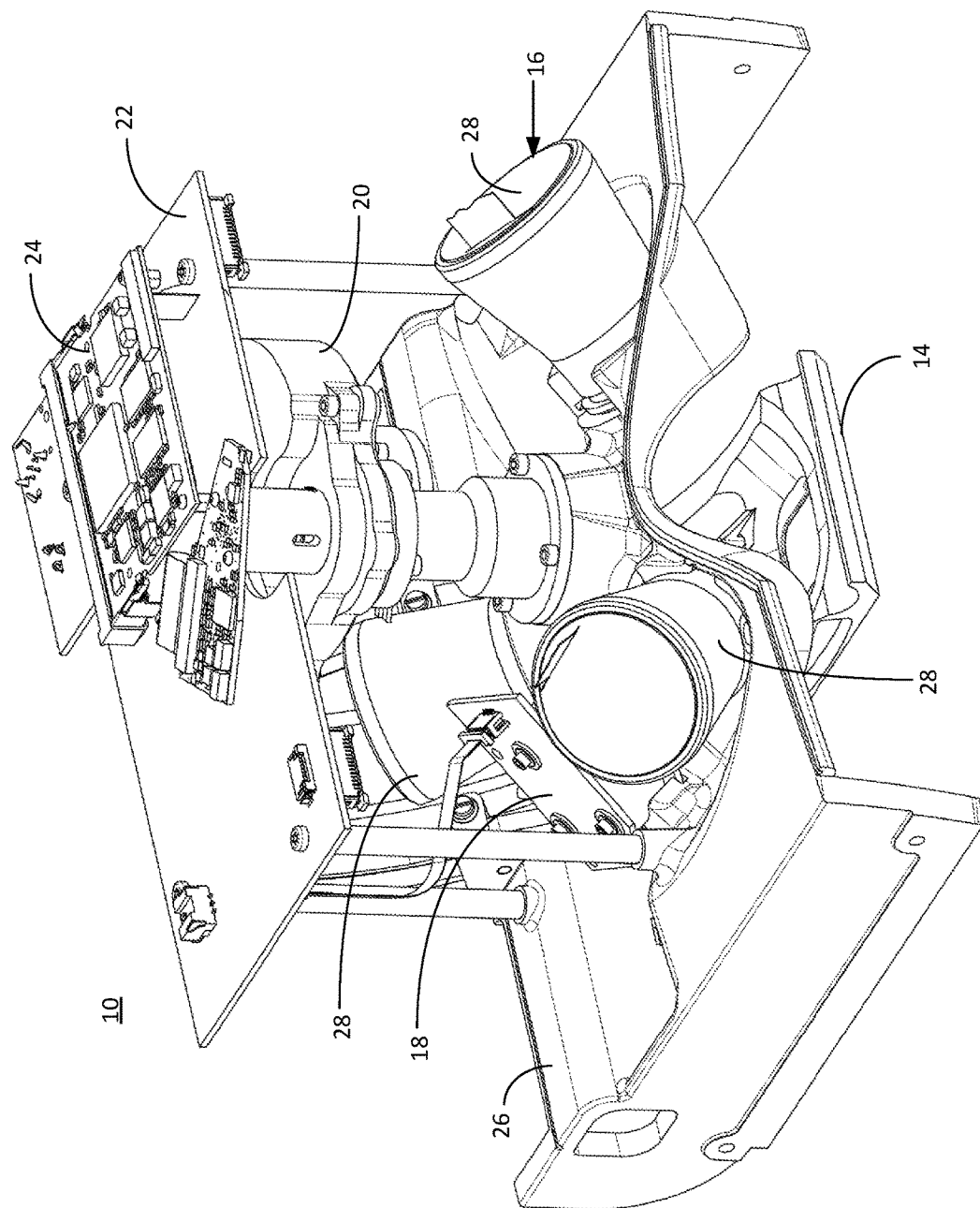
FIG. 2 is a perspective view of the example of FIG. 1 with the outer casing removed.

FIG. 1 is a perspective view of an embodiment of a hyperspectral imaging spectrophotometer 10, including an outer casing 12 and a calibration slider assembly 14. FIG. 2 is a perspective view of the hyperspectral imaging spectrophotometer 10 with the outer casing 12 removed. FIG. 2 shows the calibration slider assembly 14, an illumination assembly 16, a gloss measurement assembly 18, a pick-up optics assembly 20, a main processor 22, and an image data processor 24. These assemblies and circuit boards may be mounted directly or indirectly on a chassis 26. The illumination assembly 16 may comprise a plurality of illuminators 28. The main processor 22 and the image data processor may be separate or combined in a single processor circuit board.

Figure 3:
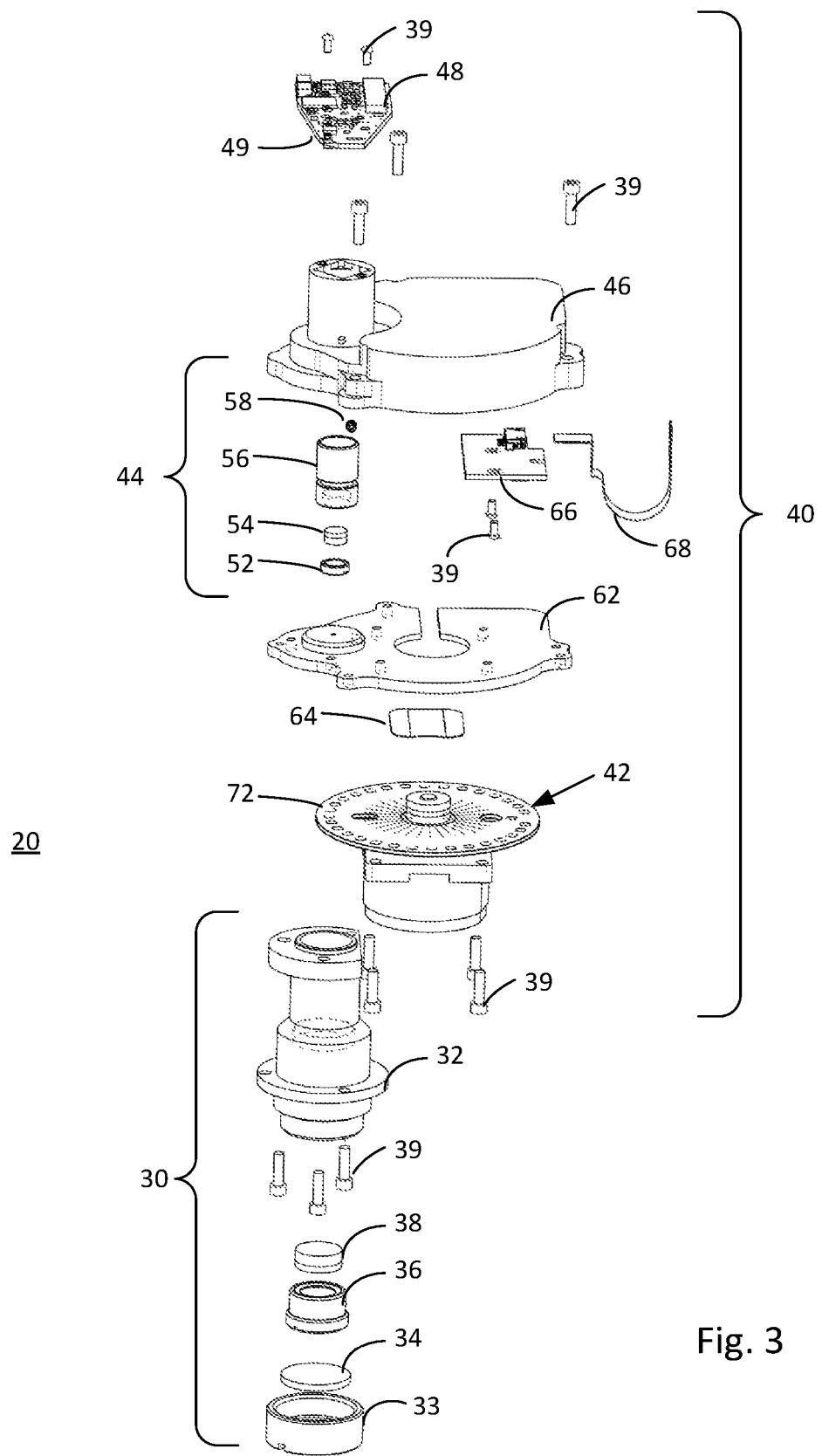
FIG. 3 is an exploded view of a pick-up optics assembly of the example of FIG. 1 according to another aspect of the present invention.

FIG. 3 is an exploded view of the pick-up optics assembly 20, comprising a lower lens assembly 30 and a spectral imaging assembly 40. The lower lens assembly 30 may comprise a lower lens mount 32, a window retainer 33 which holds an Infra-Red/Near Infra-Red block window 34, a lens retainer 36 which holds a lens 38, and screws 39. The lens 38 may comprise a front doublet lens. A spectral imaging assembly 40 may comprise a filter drive assembly 42, an upper lens assembly 44, optics cover 46 and a camera printed circuit board (PCB) 48. The upper lens assembly 44 may comprise a rear lens thread 52 holding a focus lens 54 and a focus lens mount 56. The focus lens 54 may comprise a rear doublet lens. The upper lens assembly 44 may be held in place in the optics cover 46 by a set screw 58. The filter drive assembly 42 may be mounted on a motor mount 62. A dust shield 64 may be disposed between a filter wheel 72 and the motor mount 62. The filter drive assembly 42 may also include a side sensor PCB assembly 66 and flexible cable 68.

The camera PCB 48 includes an image sensor 49 and related electronics, including firmware and/or software, for processing and transferring images to a computer. The image sensor 49 may be a CMOS sensor, CCD sensor, or other two-dimensional image sensor. The image sensor may be monochromatic or multispectral, such as RGB. In one example, image sensor 49 comprises a 4-8 megapixel RGB CMOS sensor.

FIG. 4a is an exploded view of the filter drive assembly 42, and FIG. 4b is a side view of the filter drive assembly 42. The filter drive assembly 42 comprises a filter wheel 72, a filter wheel actuator 74, and filter wheel controller 76. In one example, the filter wheel has 32 positions with 31 apertures. In some embodiments, thirty of the apertures include color filters. In some embodiments, the remaining aperture may have no filter and may be used as an open air measurement position (i.e., non-filtered measurement). The position without an aperture is a closed position, completely blocking light, to allow for measurement of the image sensor's dark current.

The filters exist to provide a reflectance measurement at specific wavelengths. For example, the filter wavelengths may be evenly spaced between 400 nm and 700 nm. In this example, the filters may have passband functions with nominal peaks every 10 nm. Fewer filters may be used for lower resolution spectral measurement, and more filters may be used for higher resolution spectral measurements. Fewer filters may allow for fewer images to be taken and to make a complete set of measurements faster, at a cost of some precision. Fewer filters may be suitable such as in connection with ambient light correction related measurements, especially if ambient light levels are weak. Interpolation of measurements acquired at a plurality of filter wavelengths may be used to estimate reflectance at wavelengths between filter measurement bands. Some embodiments of the hyperspectral imaging spectrophotometer system may comprise a filter wheel, for example because a filter wheel may have a small form factor, but that is only one example of how to present filters individually. The filters may be provided in alternative structures, such as a linear array of filters, for example.

The filter wheel actuator 74 may comprise a stepper motor. The filter wheel controller 76 may comprise circuitry including a stepper motor controller IC and motor home sensor.

The illumination assembly 16 and pick-up optics assembly 20 are arranged such that the lower lens assembly 30 receives light reflected from a measurement surface and focuses the light on an aperture (or the closed position) of the filter wheel 72. The upper lens assembly 44 focuses light passing through an aperture on the filter wheel 72 (filtered or unfiltered) onto the image sensor 49. The optics may provide any suitable field of view and magnification. For example, the field of view may be in the range of 15-18 mm, and the magnification may be in the range of 0.224 to 0.274.

While a 4-8 megapixel RGB image sensor facilitates obtaining a high resolution live view for sample positioning, the high resolution may result in an increased processing burden for the resultant image cube. For example, one example of an RGB sensor has full raw resolution of 2608×1952 pixels. Coupled with the optics above, this would result in a full sensor resolution of 96 pixels/mm. This resolution is higher than necessary to ascertain colors for most samples being measured. The resolution (and processing burden) may be reduced for each image corresponding to a spectral measurement with "binning" and "skipping." For example, the image sensor 49 may be configured to average together 4×4 red pixels, 4×4 green pixels, and 4×4 blue pixels into grouped pixels at an image resolution of 652×488 pixels (binning), thereby reducing resolution to 24 pixels/mm. Also, pixels not responsive to a given selected narrow band filter used to acquire a given image may be skipped. The grouped pixels may then be further reduced to one gray scale value. This results in a gray measurement resolution of 12 pixels/mm.

Figure 5B:
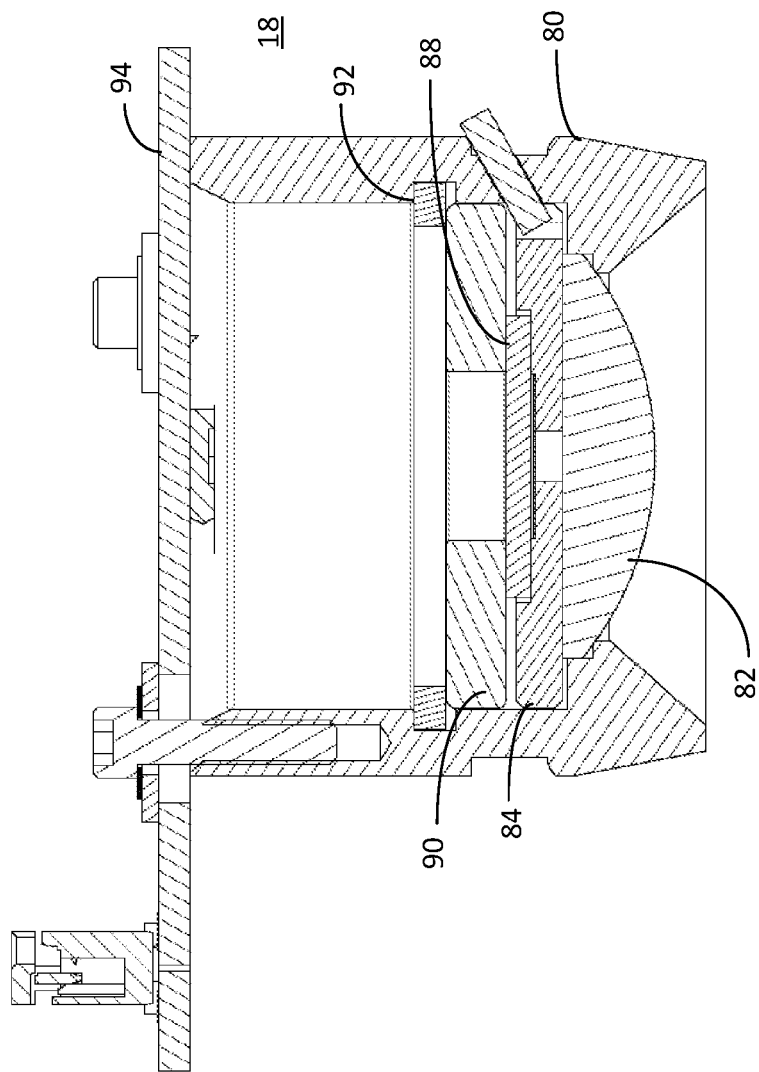
FIG. 5b is cross section view of a gloss measurement assembly of the example of FIG. 1.
Figure 5A:
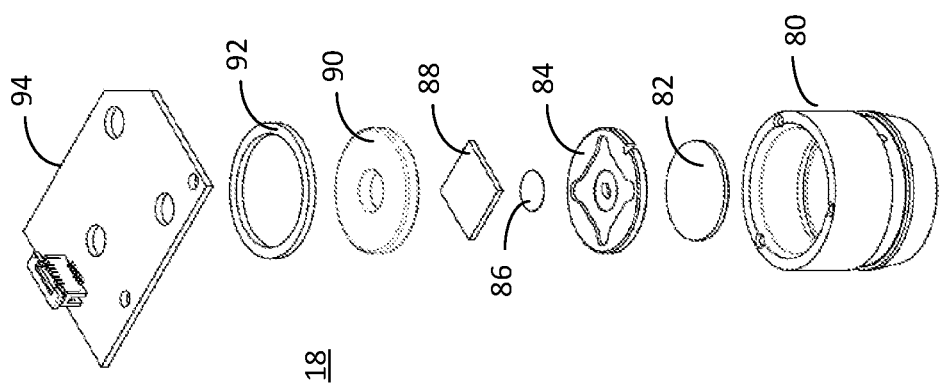
FIG. 5a is an exploded view of a gloss measurement assembly of the example of FIG. 1.

FIG. 5a is an exploded view of the gloss measurement assembly 18 and FIG. 5b is a cross section view of the gloss measurement assembly 18. The gloss measurement assembly 18 may comprise gloss barrel 80, gloss pick-up lens 82, gloss lens retainer 84, gloss filter 86, IR filter glass 88, lens retainer 90 wave ring 92, and gloss PC board assembly 94. The gloss PC board assembly 94 includes a gloss sensor, such as a photo diode or a photodiode array. The gloss measurement assembly 18 may be located to be collinear with one of the illuminators 28. For example, where an angle of illumination to a surface to be measured defines a plane of incidence, the gloss measurement assembly 18 may be in the plane of incidence of one of the illuminators 28. Gloss measurements may be made by the gloss measurement assembly 18 in combination with the illuminator 28 opposite of it and in the same plane.

The illumination assembly 16 may comprise a plurality of illuminators 28. Each illuminator 28 may comprise one or more of LED, incandescent, fluorescent, arc, flash or other suitable light sources. For example, an illuminator 28 may comprise a broadband white LED or, preferably, independently controllable red, green and blue LEDs. Preferably, the LED illuminators may be regulated for one or more of temperature and brightness. In the illustrated example seen in FIG. 2, there are three LED illuminators 28 spaced 120° apart in azimuth. The LED illuminators 28 are also angled 45° in elevation with respect to a subject measurement area, such as sample window 15 or calibration target surface 19. This provides a 45/0 measurement geometry. Other illumination angles and measurement geometries may also be used, including spherically diffuse illumination. The illuminators may be designed to provide searchlight, or collimated, illumination in order to minimize depth of field errors at the sample plane. The LEDs in the illuminators 28 may be operated in continuous illumination mode or the LEDs may be modulated, such as with pulse width modulation.

Figure 7:
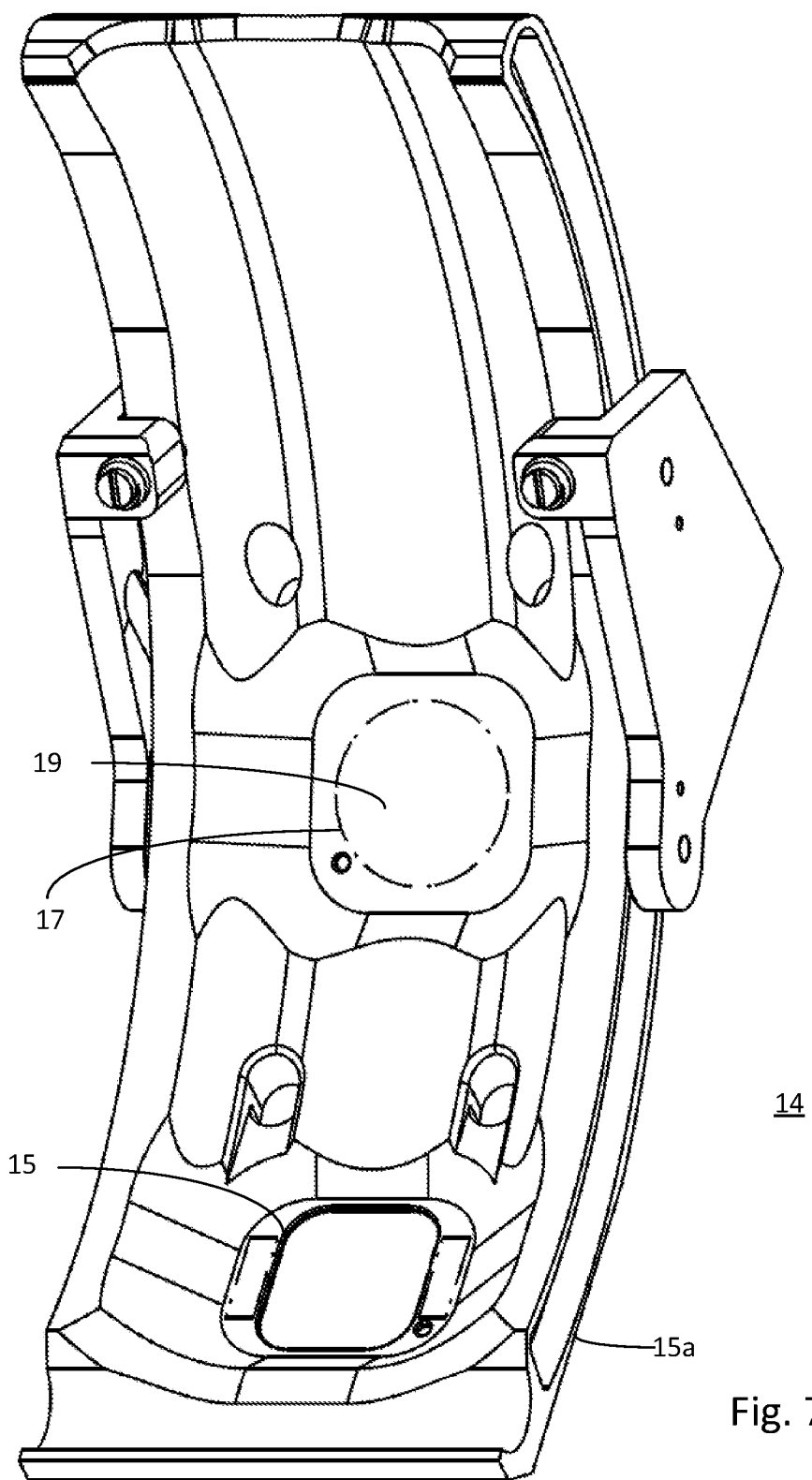
FIG. 7 is a view of the calibration slider of the example of FIGS. 1 and 2.

Referring to FIG. 7, the calibration slider assembly 14 includes a sample window 15 a calibration target support 17 (phantom lines) and a calibration target surface 19. The calibration target support includes a slider mechanism which includes a measurement position, a calibration position and a recessed position (for cleaning). When the sample window 15 or calibration target surface 19 are positioned under the pick-up optics assembly 20, they are within the measurement area of the hyperspectral imaging spectrophotometer 10. The measurement position assists with correct targeting in a desired location on a sample. The calibration target position also provides surfaces of known reflectance, such as calibration target surface 19, which may be used via correlation to characterize the illumination being applied to the sample being measured. The calibration slider assembly 14 may also comprise one or more base surfaces, pads, or rails 15a near the underside of the sample window 15a to flatten paper samples, textile samples, and the like. In addition to sliding mechanisms, additional structures may be used to move a calibration target into view and out of view of the measurement optics.

The calibration target surface may comprise a conventional target surface, such as made of porcelain on steel materials. Some embodiments may comprise a push-broom scanner, where sensors measure a line of pixels, and then translation of either the scanner or the sample allows successive measurements to build up data in two spatial dimensions.

In addition to the assemblies described above, additional assemblies may be included, such as a power assembly, a user interface 95 comprising, for example, a button (switch) assembly for initiating a measurement and status LEDs. The hyperspectral imaging spectrophotometer system 10 may also include one or more communication ports 96 for connecting the hyperspectral imaging spectrophotometer 10 to a personal computer (PC) 98. The communication ports may include wired (e.g., USB) or wireless technologies (e.g., Bluetooth, WiFi). Additional accessories may be provided externally from the outer casing 12, such as gray backing on which a sample may be placed for translucence measurement and additional color calibration tools (e.g., color checker tiles and references).

The main processor 22 is coupled to and configured with appropriate firmware instructions to control and operate the illumination assembly 16, gloss measurement assembly 18, and pick-up optics assembly 20 according to the methods described herein. The main processor 22 further communicates acquired spectral image data to the image data processor 24.

Figure 6:
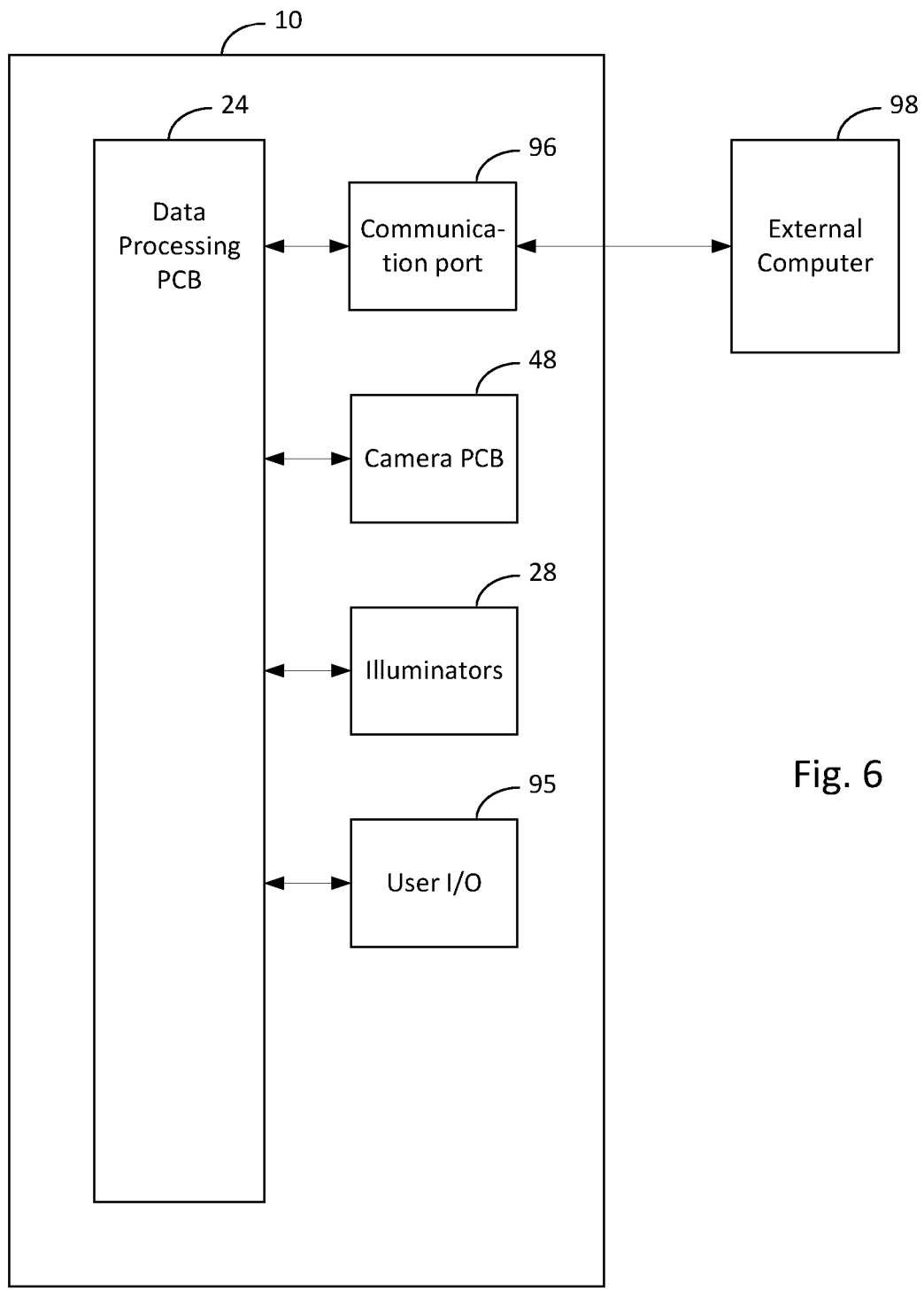
FIG. 6 is a block diagram of a hyperspectral imaging spectrophotometer system of the present invention in combination with a personal computer according to another aspect of the present invention.

In an example illustrated in FIG. 6, a personal computer (PC) 98 is provided to be used in connection with the imaging spectrophotometer. The PC 98 includes software to provide the following functionality: provide a user with the ability to select a region of interest (ROI), and return measureable attributes of the ROI. The measurable attributes may include color, texture, translucence and shape, for example one or more of shape dimensions and area. The PC 98 may also provide tilt correction to sample images. The PC 98 may also provide related functionality, such as electronic color standard fan deck lookup in a locally or remotely stored database to allow users to select a color from a pre-existing color library.

The present invention may be used in a workflow where a user would like to measure the color of a physical object, and then render or reproduce that color as in a mixture of paint, ink, or other colorant set such that the reproduced coloring agent when applied to various objects provides an acceptable visual match to the original physical object. The user's physical object color may be highly uniform, or may contain spatial color patterns or patches, for example contiguous patches, where the color of interest is represented.

The multispectral imaging spectrophotometer hardware and processing algorithms provide accurate color match on many textured and non-planar samples by controlling the effect of specular glints, shadowing, and other artifacts, effectively removing them from the measurements. Hardware and algorithms (as described in more detail below) also allow extraction of desired color from multi-colored samples.

Figure 8:
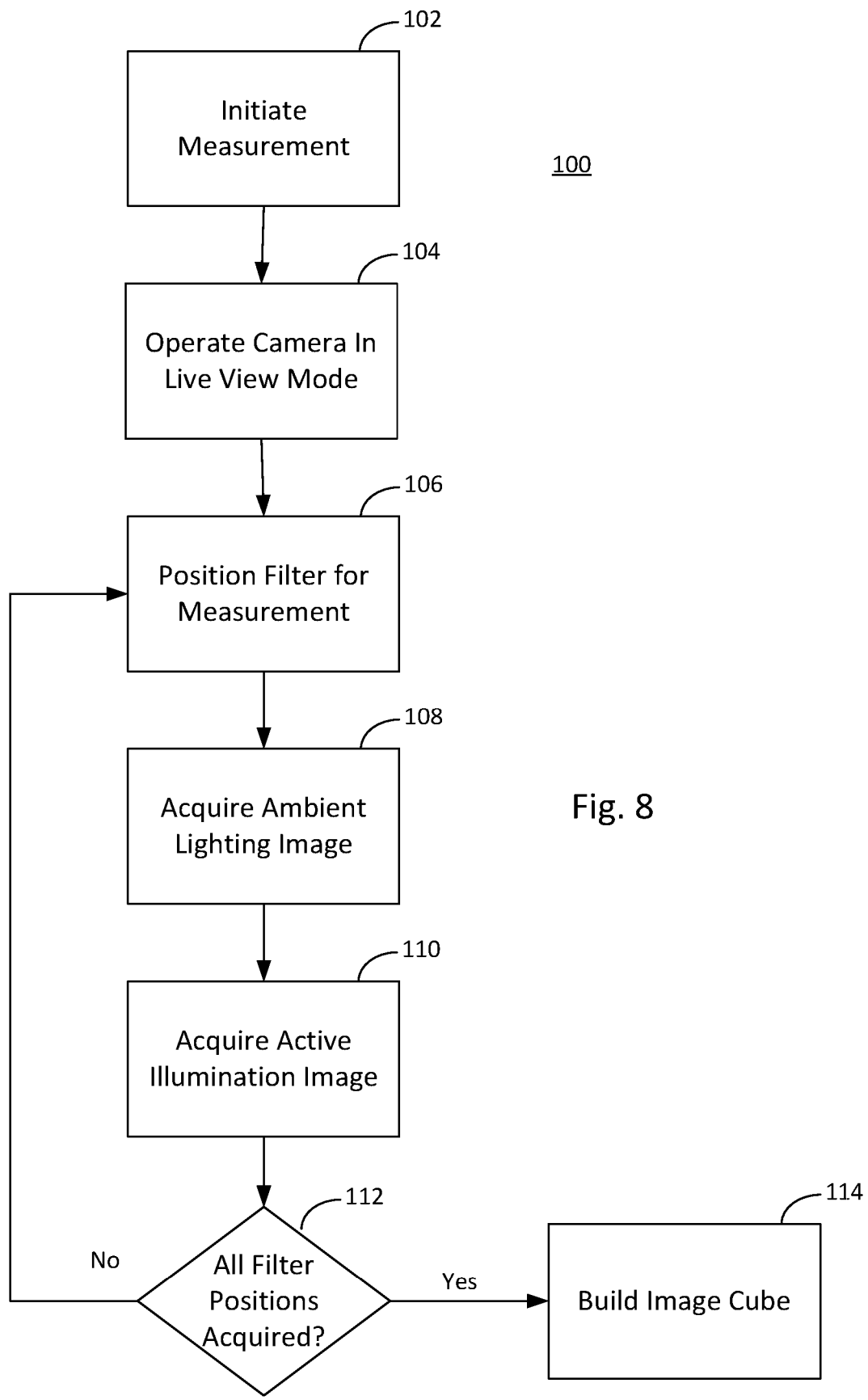
FIG. 8 is a flow chart of a process of building a hyperspectral image cube according to another aspect of the present invention.

Referring to FIG. 8, in one example of a hyperspectral measurement process 100, the main processor 22 provides signals to the filter wheel controller 76 to step the filter wheel 72 through each filter wheel position while also controlling the illumination assembly 16 and the camera PCB 48 to acquire one or more images at each wheel position. For example, a user may initiate a measurement in step 102. The main processor 22 may optionally advance the filter wheel 72 to the open (no filter position) and operate the camera PCB 48 in a live view video mode in step 104. The main processor 22 may communicate the live view video of the image sensor's field of view to a connected personal computer (PC) 98. This facilitates placement and orientation of the sample surface to be measured. The main processor 22 may optionally advance the filter wheel 72 to the closed position and deactivate the illumination assembly 16, and an image may be acquired to measure the image sensor's dark current. The main processor 22 may then advance the filter wheel 72 to a first filter position in step 106. The main processor 22 may cause the camera PCB 48 to acquire an image with illuminators 28 off for acquisition of an ambient lighting image in step 108, and another image with illuminators 28 on to obtain an active illumination image in step 110. Comparison of ambient illumination images with illuminated images allows for correction for ambient lighting. In step 112, main processor 22 determines whether images have been taken at all filter positions. If not, the filter wheel 72 is advanced to the next position in step 104 and the measurements repeated. The filter wheel 72 may be successively advanced through each of the filter window positions and the open position. In this way, the hyperspectral imaging spectrophotometer 10 acquires thirty different wavelengths of spectral reflectance data, along with surface texture reflectance data at each wavelength. When all of the different measurements are obtained, the image cube is assembled in step 114 by image data processor 24. The image cube may comprise a set of grey scale images, where two dimensions (x, y) of the cube correspond to the field of view of the image sensor 49 (e.g., an image of the surface being measured), and a third dimension (z) corresponds to a plurality of measurements at different wavelengths. However, the image cube need not be represented as an actual or virtual cube. The image cube may comprise a three-dimensional array of pixel values, where two dimensions represent an array of pixels corresponding to an image of a sample being measured, and a third dimension of the array corresponds to a given pixel over the range of measurement wavelengths. Additional dimensions to the array may be added for additional measured reflectance properties.

At the open, non-filtered position the illuminators may be activated for a gloss measurement by the camera PCB 48. The illuminators 28 may also be activated individually and separate images acquired from each illumination direction for additional gloss/texture measurements. The images acquired by the camera PCB 48 may be combined with gloss measurements made by the gloss measurement assembly 18.

A method for determining the colors to report from an image cube as measured and assembled according to the example of FIG. 8 may be structured around two major steps: identification of the significant colors in the image, and calculation of the values in a standard color space (e.g., CIELAB, CIEXYZ, reflectance, SRGB), that optimally correspond to the visual perception of the color, for each significant color.

There are multiple reasons for the presence of multiple colors in the image of an object, and there are multiple methods for calculation of the optimal color values for a color. An object such as wood flooring may naturally contain multiple colors. An object may also be produced to have multiple colors, for example, textiles made from multiple color threads, or printed images. And the physical texture of an object may cause an image of it to have different colors, due to variations in shadows and specular reflections.

The identification of the significant colors in an image starts with representing the 3D image cube as color values in a standard color space, and then determining the histogram of these color values. For example, a reflectance curve may be constructed for each pixel (such as the grouped pixels) corresponding to a measured spot on a sample surface by applying intensity values corresponding to each of the measurements at each spectral filter wavelength. These reflectance curves may be transformed into color coordinates in a three-dimensional color space through conversion processes known to persons of skill in the art. The three dimensional color space may comprise, for example, the CIELAB or CIEXYZ color spaces. In the example provided above, this would result in 12 individual color measurements per square millimeter along a direction on the surface being measured. A color histogram may be determined from these values.

To extract colors from a complex measured sample, a starting point is to identify local maxima in the histogram. Some images with multiple colors may not have color distributions with well-defined peaks for each color. For these images, a thresholding method, such as Otsu's method or an entropy based method, can separate the histogram into multiple regions of color space, even without a local maximum inside the region.

The calculation of the optimal color in an image of an object to match the visual perception of the object has multiple steps. The basic step is to identify the region of interest in the image, whose color best matches the visual perception of the object. This region of interest is not necessarily contiguous, and images in which the region of interest is not contiguous are the images for which the hyperspectral imaging spectrophotometer 10 may be the most valuable. That is because an optimal color may be accurately measured by performing a traditional spectrophotometer spot measurement (which averages color over the entire measurement area of the spectrophotometer) if the object has a sufficiently large region of uniform color.

The calculation of the region of interest will be performed in color space, starting with the data previously used to identify the presence of the color. Studies of the human visual process have found that when it recognizes objects in a scene, it will perceive the color as a single property of the object, even though it may be sensing multiple colors from different regions of the object, due to shadows, specular highlights, or other effects. Accordingly, a region in color space that optimally matches a perceived object color may be calculated.

For the above approach to be successful, the color which matches human perception of the object must be present in the images. Some additional steps may be included in the method when this condition is not met. Steps that modify the image to more closely match perceived color are used in combination with the basic region of interest step described above.

One such optional step is to calculate a lightness correction factor to be applied to an image, for example when every pixel in the image includes some shadowing. This may be the situation for samples that have particularly high levels of physical texture. The specific value of the scale factor will also depend on illumination supplied to the sample by the hyperspectral imaging spectrophotometer 10. For example, a larger scale factor is likely to be needed when using a 45° illumination geometry than when using diffuse illumination geometry. Such a scale factor may be determined based on the overall variation in lightness in the color region under consideration.

Another optional step to modify color values from the image is one that compensates for multiple opposing colors in the image. The perceptual effect that such methods correspond to is the effect of surrounding colors on perception of the color at a location in an image. Models that correct for such perceptual effects are known as image color appearance models. While the initial motivation for such models was to produce a natural appearance in the display of photographic images, in this method they are used to determine the perceived color based on a measured image.

A step related to the method as described above is a step to evaluate the uniformity of the image, to determine whether to use a simple average of the measured values, or to use the method described above. Ideally, even if it is reasonable to use a simple average of measured values, the method described above should provide values that are within the usual color tolerances for such measurements. The advantage to detecting whether an image is sufficiently uniform to use simple averaging is to avoid the increased processing time with the color extraction method.

In some embodiments, the system may operate as a stand-alone instrument that provides a user interface. For example, the system may comprise one or more built-in displays and buttons to allow user interaction including selecting a region of interest, a built-in touch-screen display to allow user interaction including selecting a region of interest, or wireless communication to a computer or a mobile device to allow user interaction including selecting a region of interest. One example of allowing a user to select a region of interest can be a simple user-selectable measurement area, such as a circular shape of any size defined by the user. As another example, the measurement area selectable by the user may comprise any arbitrary set of pixels defined, for example designated via a touch-sensitive display, by the user.

The hyperspectral imaging spectrophotometer 10 preferably performs image processing on the acquired images as discussed above, for example, by the image data processor 24. The image data processor 24 may comprise a computer module having a processor and memory, including an operating system, for example a Linux operating system, that provides the computing and image processing onboard. Instructions stored in firmware on the image data processor 24 provide image processing capabilities including ambient light rejection, calibration algorithms calculating reflectance from raw image cubes, color extraction from complex samples through processes described herein, including automatic detection of multiple colors in a region of interest, automatic selection of multiple regions of the same color, sorting of colors in the region of interest to obtain reflectance measurements for each color, for example each color filter, and production of a histogram of the region of interest. Ambient light rejection may be provided by taking measurements with and without illumination from the illumination assembly and then performing subtraction (such as digitally) to eliminate ambient light. Physical shielding may also be used to prevent ambient light from illuminating the sample being measured.

Figure 9:
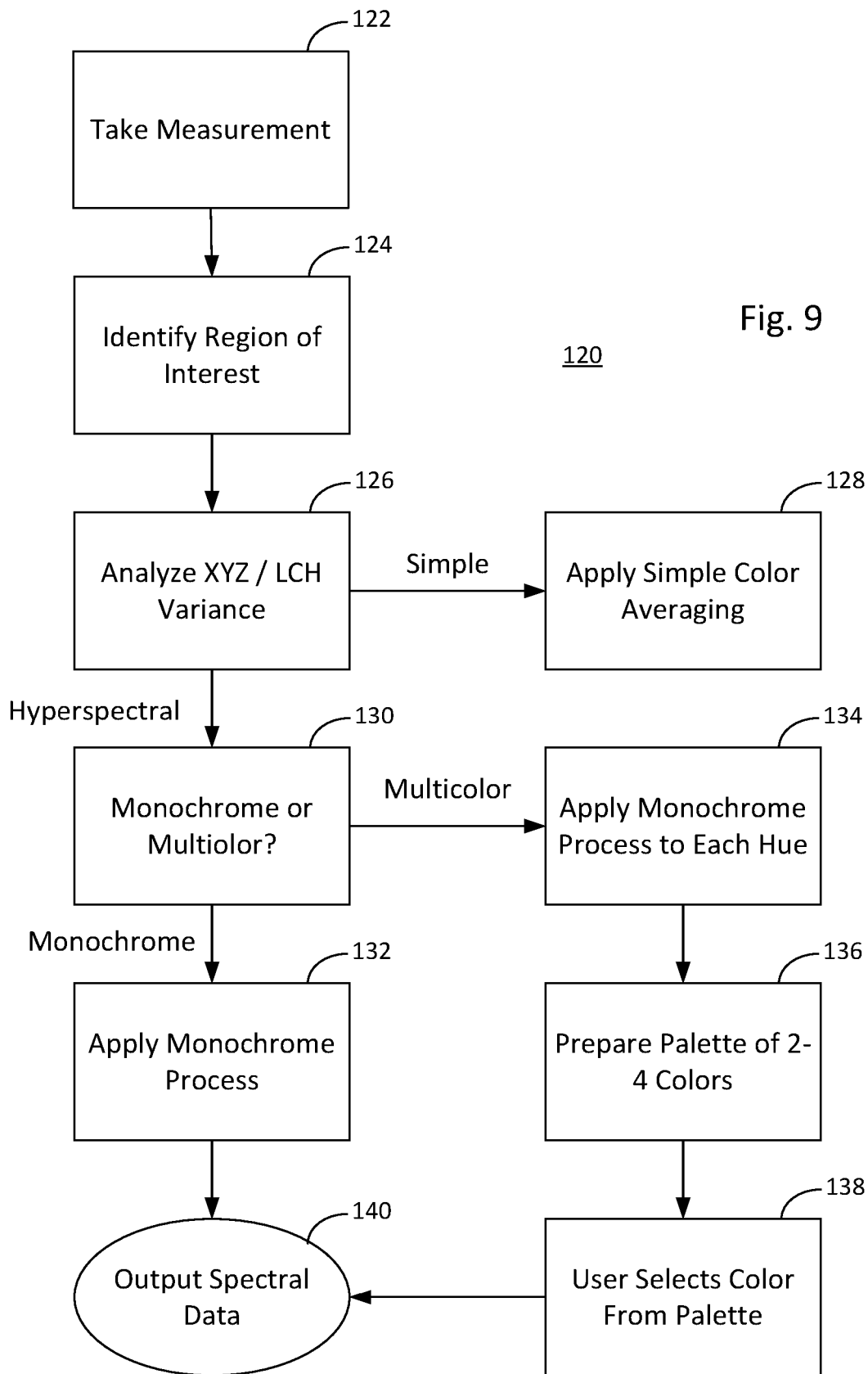
FIG. 9 is a flow chart of a process of outputting spectral data of a sample according to another aspect of the present invention.

As illustrated in the FIG. 9 flow chart, an example of a process 120 for extracting one or more colors from an inspiration sample may proceed as follows: A user may initiate a hyper spectral measurement of a sample in step 122 as described with respect to FIG. 8 above. A Region of Interest (ROI) is identified in step 124. An initial analysis is performed to determine XYZ/LCH variance of the ROI in step 126. If the ROI has a sufficiently large region of uniform color, a decision may be made to perform a simplified color analysis in step 128. If not, then a determination is made to apply a monochrome process (FIG. 10) or a multicolor process in step 130. When the sample has a color that is relatively uniform, the monochrome process may be selected in step 132 to reduce processing time. When the sample has two or more hues, a multicolor process may be applied in step 134. The multicolor process may involve applying the monochrome process to more than one hue. When each hue has been processed, a palette of multiple colors (for example, two to four dominant colors) may be presented to the user in step 136. Colors may be ranked from most dominant to least dominant. The user may select a desired color from the palette in step 138. At the end of each process, spectral data for the measured color may be output in step 140.

Figure 10:
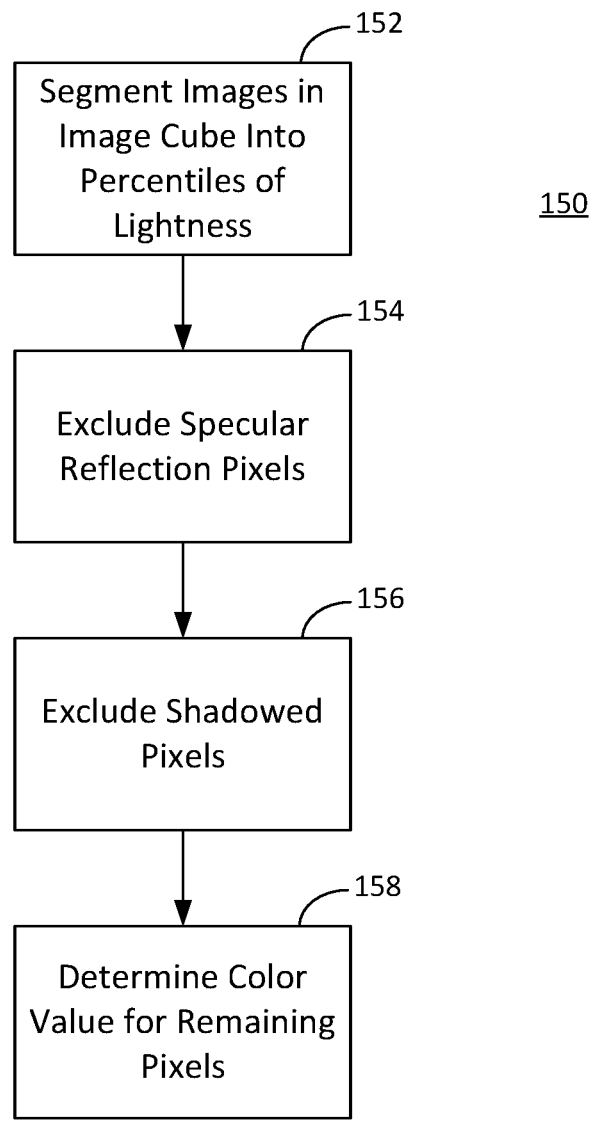
FIG. 10 is a flow chart of a monochrome color measurement process of a spectral image according to another aspect of the present invention.

Referring to FIG. 10, the monochrome process 150 may involve the following steps. The image may be segmented using percentiles of lightness or luminance in step 152. The minimum lightness may be the $50^{th}$ percentile or greater. The maximum lightness may be set by one of the following: chrome versus lightness peak, $95^{th}$ percentile lightness, excluding highest lightness bin, or by difference over median. Pixels having a measured intensity that is above a certain threshold, for example above 95 percent of intensity range, may represent specular reflections and may be excluded from color measurement in step 154, and pixels that are lower than the $50^{th}$ percentile may represent shadows from surface texture and may be excluded from color measurement in step 156.

The remaining pixels are analyzed to determine a color value for the image in step 158. Pixels that are not excluded from color measurement may be segmented or clustered into bins. For example, pixels may be clustered based on hue, chroma and lightness. The bins may then be ranked by the number of pixels in each bin. Bins with the highest number of clustered pixels may be considered the dominant colors of the measurement. An example of one process for determining color once pixels are segmented into bins and ranked for dominance is a simple average. Another example is a weighted average, based on location in color space. For a basic monochrome process, this is an applied direction to the measured values from the 3D image cube. If lightness correction is necessary, the lightness correction factor may be used to scale the reflectance values at this point in the process or before applying the monochrome process.

As a first example of one approach for an appearance/opposing colors compensation process, it is noted that the appearance compensation process produces a transformation of the image in XYZ space. A difference in average XYZ values is determined between the untransformed and the appearance-transformed color values in the XYZ color space. Then a corresponding difference in spectral reflectance values is calculated to match the difference in XYZ values, with the calculated spectral difference as a linear combination of spectral reflectance values of pixels in the image. At this point, the process continues just as with the monochrome process, but using the transformed 3D image cube rather than the raw 3D image cube.

A second example of an approach for an appearance/opposing colors compensation process would be to calculate a spectral difference based on the spectral curves of the colorants in a formulation system. A third example would be to match the untransformed reflectance values, but to use the difference between untransformed and transformed color values in the target metric for formulation. The second and third examples can be implemented when the described instrument is part of a formulation system, but the first example is applicable to a stand-alone instrument.

The described system has uses in addition to retail paint matching, especially in industrial labs where color is measured on textured or shaped samples. In some embodiments, the system is tethered to a computer, does not have an on-screen display, and uses a software application for color selection from an image, automatic calibration, on-screen targeting, line-of-sight targeting, or bar code scanning, for example.

From the foregoing, it will be understood that numerous modifications and variations can be effectuated without departing from the true spirit and scope of the novel concepts of the present invention. It is to be understood that no limitation with respect to the specific embodiments illustrated and described is intended or should be inferred.

The invention claimed is:

1. A hyperspectral imaging system for measuring one or more colors of a sample surface, comprising:
a sample measurement area;
a pick-up optics assembly including a plurality of selectable spectral filters having different nominal peak wavelengths and a light sensor, where a field of view of the light sensor includes at least a portion the sample measurement area;
at least one processor coupled to the pick-up optics assembly, the at least one processor being configured with instructions stored in non-volatile memory to:
operate the pick-up optics assembly to obtain scans comprised of at least one scan of the sample measurement area for each spectral filter of the plurality of selectable spectral filters;
assemble the obtained scans into a hyperspectral image cube having two dimensions corresponding to the obtained scans of the sample measurement area and a third dimension corresponding to the nominal peak wavelengths of the plurality of selectable filters;
wherein a plurality of colors are determined for the sample surface by constructing a reflectance curve for each of a plurality of pixel locations in the image cube with respect to the nominal peak wavelengths of the plurality of spectral filters, and transforming each of the reflectance curves corresponding to the plurality of pixel locations into coordinates in a three-dimensional color space.

2. The hyperspectral imaging system of claim 1, wherein the at least one processor is further configured with instructions to:
identify a region of interest in the image cube;
analyze the region of interest to determine whether a sufficient area of uniform color exists to permit a simple color averaging function; and
if a sufficient area of uniform color exists, perform a simple color averaging process to determine a color of the region of interest; and
if a sufficient area of uniform color does not exist, segment pixels of an image to exclude pixels including shadowed surfaces and to exclude pixels including specular reflections resulting in a set of remaining pixels, and to determine a color of the remaining pixels.

3. The hyperspectral imaging system of claim 2, wherein the at least one processor is further configured to process the image cube to determine at least one color of the sample surface by determining a color of the remaining pixels for a plurality of hues.

4. The hyperspectral imaging system of claim 3, wherein a plurality of dominant hues are identified and presented to a user.

5. The hyperspectral imaging system of claim 2, wherein the segmenting comprises segmenting pixels having a lightness lower than the $50^{th}$ percentile into a first bin, segmenting pixels having a lightness at or above the $95^{th}$ percentile into a second bin, and the remaining pixels into a third bin, wherein a color of the third bin is determined.

6. The hyperspectral imaging system of claim 1, further comprising an illumination assembly including a plurality of illuminators directed toward the sample measurement area.

7. The hyperspectral imaging system of claim 1 further comprising an illumination assembly, wherein the at least one processor comprises a main processor coupled to the pick up optics assembly and the illumination assembly, wherein the main processor is further configured with instructions stored in non-volatile memory to obtain an image under ambient lighting illumination and active illumination at each spectral filter step.

8. The hyperspectral imaging system of claim 1 further comprising an illumination assembly, wherein the at least one processor comprises a main processor coupled to the pick up optics assembly and the illumination assembly and an image data processor which receives images from the main processor.

9. The hyperspectral imaging system of claim 1 further comprising an illumination assembly, wherein the at least one processor comprises a main processor coupled to the pick up optics assembly and the illumination assembly, wherein the obtained scans comprise images, and wherein the main processor is further configured with instructions stored in non-volatile memory to obtain an image under ambient lighting illumination and to obtain an image under active illumination at each spectral filter step.

10. The hyperspectral imaging system of claim 9, wherein the at least one processor further comprises an image data processor which receives images from the main processor.

11. The hyperspectral imaging system of claim 1, wherein the light sensor comprises an imaging camera.

12. The hyperspectral imaging system of claim 1, wherein the light sensor comprises a pushbroom scanner.

13. A hyperspectral imaging system for measuring one or more colors of a sample surface, comprising:
a pick-up optics assembly including a plurality of selectable spectral filters having different nominal peak wavelengths and a two-dimensional image sensor;
at least one processor coupled to the pick-up optics assembly, the at least one processor being configured with instructions stored in non-volatile memory to:
operate the image sensor to provide a live view of the field of view of the image sensor;
operate the pick-up optics assembly to obtain at least one two-dimensional image of a sample measurement area for each spectral filter of the plurality of selectable spectral filters;
assemble the images into a hyperspectral image cube having two dimensions corresponding to the image sensor and a third dimension corresponding to the nominal peak wavelengths of the plurality of selectable filters;
wherein the at least one processor is further configured with instructions to:
identify a region of interest in the image cube;
analyze the region of interest to determine whether a sufficient area of uniform color exists to permit a simple color averaging function; and
if a sufficient area of uniform color exists, perform a simple color averaging process to determine a color of the region of interest; and
if a sufficient area of uniform color does not exist, segment pixels of an image to exclude pixels including shadowed surfaces and to exclude pixels including specular reflections resulting in a set of remaining pixels, and to determine a color of the remaining pixels.

14. The hyperspectral imaging system of claim 13, wherein the at least one processor is further configured to process the image cube to determine at least one color of the sample surface by determining a color of the remaining pixels for a plurality of hues.

15. The hyperspectral imaging system of claim 14, wherein a plurality of dominant hues are identified and presented to a user.

16. The hyperspectral imaging system of claim 13, wherein the segmenting comprises segmenting pixels having a lightness lower than the $50^{th}$ percentile into a first bin, segmenting pixels having a lightness at or above the $95^{th}$ percentile into a second bin, and the remaining pixels into a third bin, wherein a color of the third bin is determined.

17. The hyperspectral imaging system of claim 13, further comprising an illumination assembly including a plurality of illuminators directed toward the sample measurement area.

18. The hyperspectral imaging system of claim 13, wherein the at least one processor is further configured with instructions to reduce the resolution of the images by grouping pixels prior to determining a color.

19. The hyperspectral imaging system of claim 18, wherein the grouping of pixels comprises grouping 4×4 red pixels, 4×4 green pixels, and 4×4 blue pixels.

* * * * *